US011917353B2

(12) United States Patent
Zhao et al.

(10) Patent No.: US 11,917,353 B2
(45) Date of Patent: Feb. 27, 2024

(54) EARBUD

(71) Applicant: Merry Electronics(Shenzhen) Co., Ltd., ShenZhen (CN)

(72) Inventors: Shenggang Zhao, Shandong (CN); Tianliang Zhang, Shandong (CN); Youzhong Li, Shandong (CN)

(73) Assignee: Merry Electronics(Shenzhen) Co., Ltd., ShenZhen (CN)

( * ) Notice: Subject to any disclaimer, the term of this patent is extended or adjusted under 35 U.S.C. 154(b) by 129 days.

(21) Appl. No.: 17/692,144

(22) Filed: Mar. 10, 2022

(65) Prior Publication Data

US 2023/0292026 A1 Sep. 14, 2023

(51) Int. Cl.
*H04R 1/10* (2006.01)
*H04R 1/02* (2006.01)
*H04R 1/08* (2006.01)

(52) U.S. Cl.
CPC ........... *H04R 1/1016* (2013.01); *H04R 1/026* (2013.01); *H04R 1/083* (2013.01)

(58) Field of Classification Search
CPC ....... H04R 1/1016; H04R 1/026; H04R 1/083
USPC ........................................................ 381/370
See application file for complete search history.

(56) References Cited

U.S. PATENT DOCUMENTS 5,844,998 A * 12/1998 Nageno ................ H04R 1/2842 381/372
2016/0192065 A1* 6/2016 Oosato ................. H04R 1/2819 381/378

* cited by examiner

*Primary Examiner* — Sunita Joshi
(74) *Attorney, Agent, or Firm* — JCIPRNET

(57) ABSTRACT

An earbud, including a housing, a speaker assembly, and a partition, is provided. The housing includes a sound outlet hole and a sound tuning hole, wherein the sound outlet hole is in acoustic communication with an ear canal of a human ear but does not contact the ear canal. The speaker assembly is disposed in the housing to separate a space in the housing into a front cavity and a rear cavity. The partition is disposed in the front cavity of the housing to divide the front cavity into a first area close to the speaker assembly and a second area away from the speaker assembly. The partition is between the first area and the second area, and the partition has a thickness and includes multiple first through holes, wherein the first through holes pass through the partition to connect the first area with the second area.

10 Claims, 2 Drawing Sheets

EARBUD

BACKGROUND

Technical Field

The disclosure relates to an earbud, and in particular relates to an earbud.

Description of Related Art

There are no other components between a diaphragm and a sound outlet hole in the front of a conventional earbud, so that the output sound is direct and the sound damping is smaller. On the contrary, a speaker driver basin frame and a rear cavity are between the diaphragm and a sound tuning hole in the back, thus the sound damping is larger. The difference in sound damping causes a mismatch between the sound volume and the phase of the sound outlet hole and the sound tuning hole, such that the sound directivity is not obvious in some frequency bands, resulting in sound leakage. Even if a mesh structure is disposed between the diaphragm and the sound outlet hole in other conventional designs to increase sound damping, an ideal acoustic mass still cannot be achieved.

SUMMARY

The disclosure relates to an earbud, which provides better acoustic mass and acoustic resistance.

According to an embodiment of the disclosure, the earbud includes a housing, a speaker assembly, and a partition. The housing includes a sound outlet hole and a sound tuning hole, in which the sound outlet hole is in acoustic communication with an ear canal of a human ear but does not contact the ear canal. The speaker assembly is disposed in the housing to separate a space in the housing into a front cavity and a rear cavity. The partition is disposed in the front cavity of the housing to divide the front cavity into a first area close to the speaker assembly and a second area away from the speaker assembly. The partition is between the first area and the second area, and the partition has a thickness and includes multiple first through holes. The first through holes pass through the partition to connect the first area with the second area to generate an acoustic mass effect.

In the earbud according to the embodiment of the disclosure, a hole diameter of each of the first through holes is greater than 0.6 mm.

In the earbud according to the embodiment of the disclosure, an axial length of each of the first through holes is greater than 0.6 mm.

In the earbud according to the embodiment of the disclosure, the thickness of the partition is greater than 0.6 mm.

In the earbud according to the embodiment of the disclosure, the speaker assembly includes a frame, multiple second through holes formed at the frame, and a diaphragm disposed at the frame. The second through holes are formed on the frame, and a volume of a diaphragm space between the diaphragm and the frame is between 0.7 times and 1.3 times a volume of the first area.

In the earbud according to the embodiment of the disclosure, a volume of the second area is between 0.7 times and 1.3 times a volume of the rear cavity.

In the earbud according to an embodiment of the disclosure, the speaker assembly includes a frame and multiple second through holes formed at the frame. A number of the second through holes is between 0.7 times and 1.3 times a number of the first through holes.

In the earbud according to an embodiment of the disclosure, the speaker assembly includes a frame and multiple second through holes formed at the frame. A size of the second through holes is between 0.7 times and 1.3 times a size of the first through holes.

In the earbud according to the embodiment of the disclosure, a size of the sound outlet hole is between 0.7 times and 1.3 times a size of the sound tuning hole.

In the earbud according to the embodiment of the disclosure, the earbud further includes a first mesh structure and a second mesh structure. The first mesh structure is disposed at the sound outlet hole, the second mesh structure is disposed at the sound tuning hole. A difference in an acoustic resistance between the first mesh structure and the second mesh structure is between 0.8 times and 1.2 times.

In the earbud according to the embodiment of the disclosure, the housing includes a front wall and a rear wall opposite to each other, and a side wall located between the front wall and the rear wall. The speaker assembly faces the front wall, the sound outlet hole is located at the front wall, and the sound tuning hole is located at the rear wall.

To sum up, the sound outlet hole of the earbud of the disclosure is in acoustic communication with the ear canal of a human ear but does not contact the ear canal. The speaker assembly separates a space in the housing into a front cavity and a rear cavity. A partition is disposed in the front cavity of the housing to divide the front cavity into a first area close to the speaker assembly and a second area away from the speaker assembly. The first through holes pass through the partition to connect the first area with the second area, to generate an acoustic mass effect. That is to say, the earbud of the disclosure adjusts the acoustic mass and the acoustic resistance between the speaker assembly and the sound outlet hole through the placement of the partition and the first through holes, so that the sound volume and the phase of the sound outlet hole matches that of the sound tuning hole.

DETAILED DESCRIPTION OF DISCLOSED EMBODIMENTS

Figure 1:
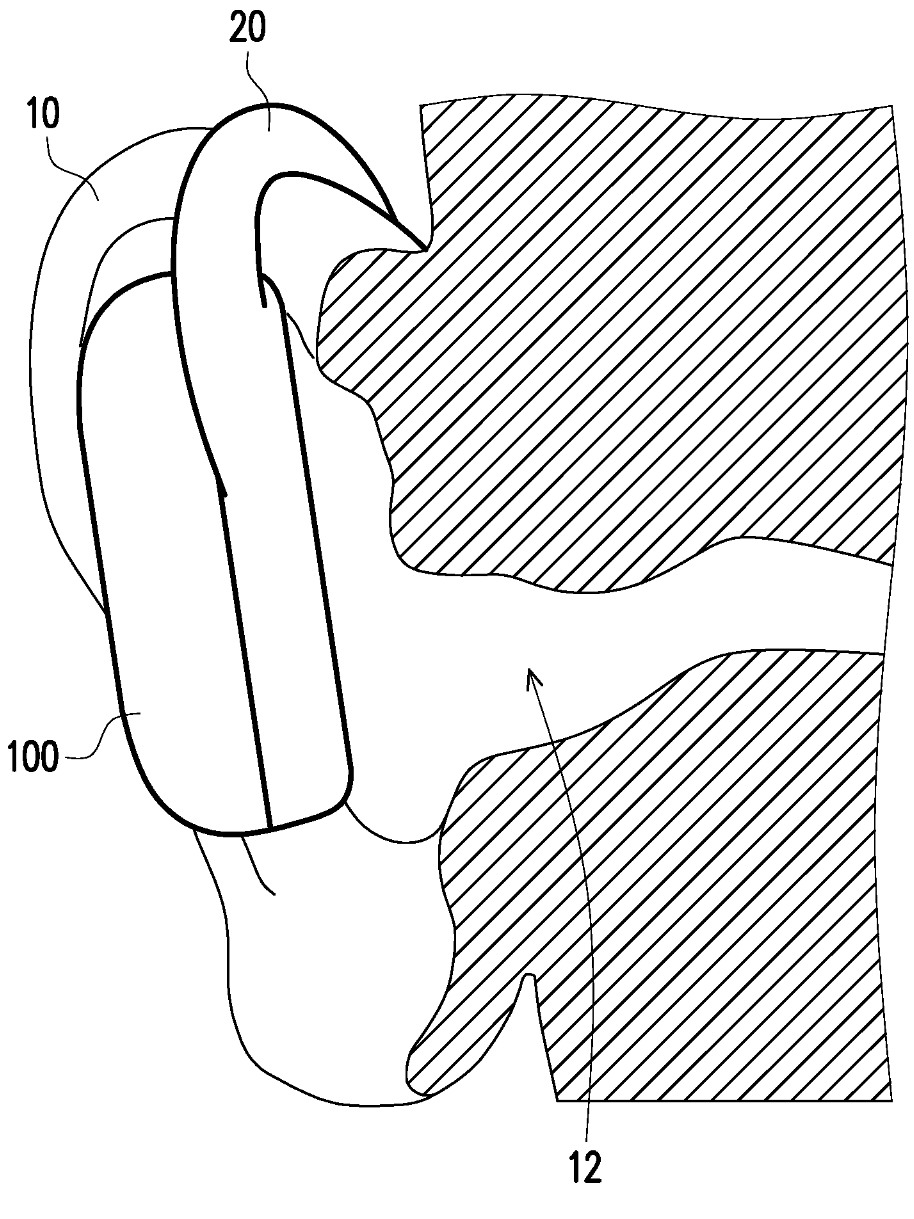
FIG. 1 is a schematic view of an earbud configured on an ear according to an embodiment of the disclosure.

References of the exemplary embodiments of the disclosure are to be made in detail. Examples of the exemplary embodiments are illustrated in the drawings. If applicable, the same reference numerals in the drawings and the descriptions indicate the same or similar parts.

FIG. 1 is a schematic view of an earbud configured on an ear according to an embodiment of the disclosure. Referring to FIG. 1, in this embodiment, an earbud 100 is hung on an ear 10 through, for example, a hook 20. The earbud 100 is in acoustic communication with an ear canal 12 of a human ear but is separated from the ear canal 12 by a distance, without directly contacting the ear canal 12. The earbud 100 is, for example, an open earbud.

Figure 2:
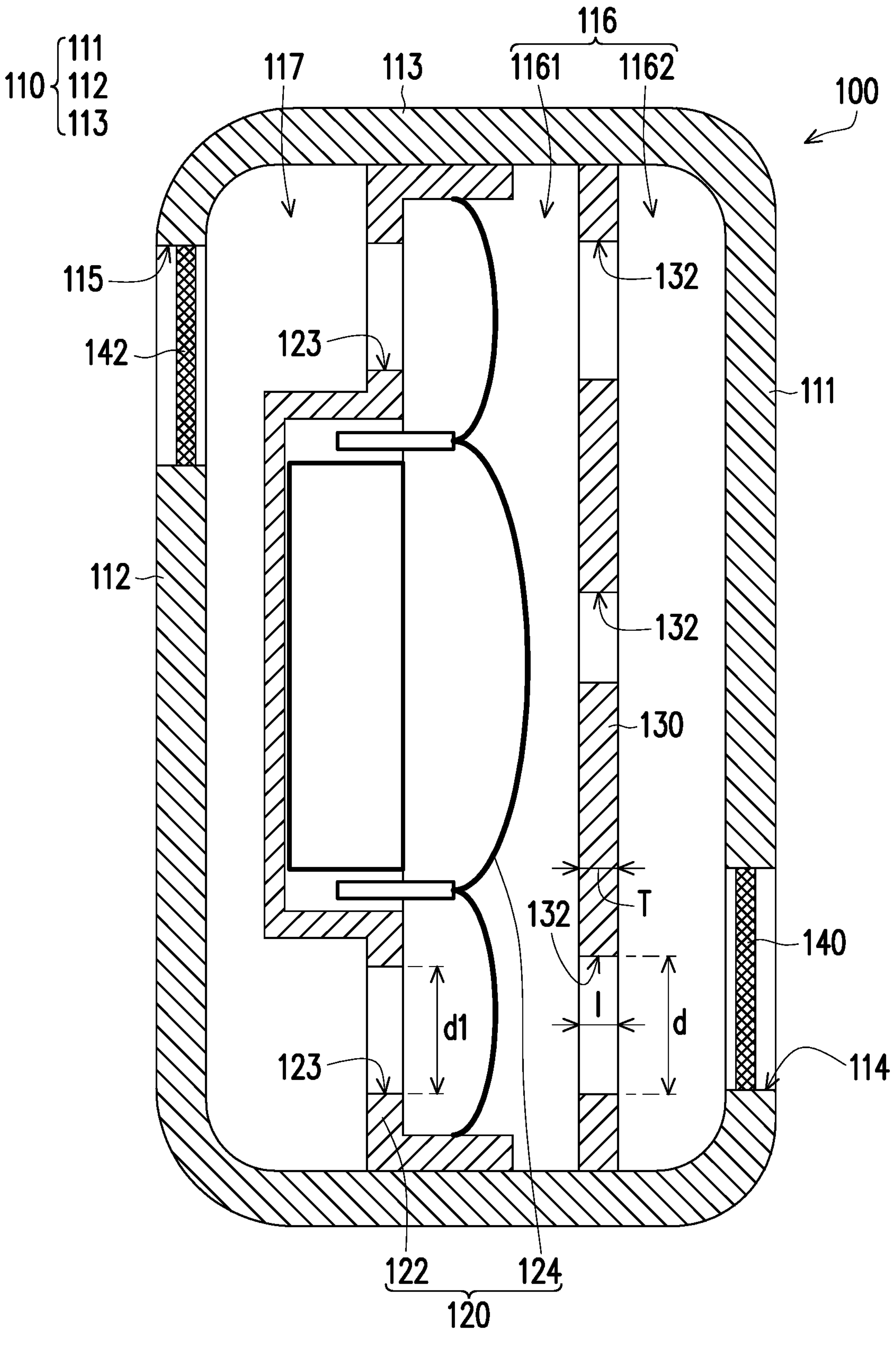
FIG. 2 is a cross-sectional schematic view of the earbud of FIG. 1.

FIG. 2 is a cross-sectional schematic view of the earbud of FIG. 1. Referring to FIG. 2, the earbud 100 includes a housing 110, a speaker assembly 120, and a partition 130. The housing 110 includes a front wall 111 and a rear wall 112 opposite to each other, a side wall 113 located between the front wall 111 and the rear wall 112, a sound outlet hole 114, and a sound tuning hole 115. The speaker assembly 120 faces the front wall 111, the sound outlet hole 114 is located at the front wall 111, and the sound tuning hole 115 is located at the rear wall 112. The sound outlet hole 114 is in acoustic communication with the ear canal 12 (FIG. 1) of the human ear but does not contact the ear canal 12. In one embodiment, the sound outlet hole 114 and/or the sound tuning hole 115 may also be located on the side wall 113.

The size (hole diameter) of the sound outlet hole 114 is between 0.7 times and 1.3 times the size (hole diameter) of the sound tuning hole 115. In one embodiment, the size of the sound outlet hole 114 is the same as the size of the sound tuning hole 115. In one embodiment, the size of the sound outlet hole 114 is greater than the size of the sound tuning hole 115 and less than 1.3 times the size of the sound tuning hole 115. In one embodiment, the size of the sound outlet hole 114 is less than the size of the sound tuning hole 115 and is greater than 0.7 times the size of the sound tuning hole 115.

The speaker assembly 120 is disposed in the housing 110 to separate the space in the housing 110 into a front cavity 116 and a rear cavity 117. The speaker assembly 120 includes a frame 122 and a diaphragm 124 disposed at the frame 122. The diaphragm 124 separates the front cavity 116 and the rear cavity 117.

There are no other components between a diaphragm and a sound outlet hole in the front of a conventional earbud, so that the output sound is direct and the sound damping is smaller. On the contrary, a frame and a rear cavity are between the diaphragm and a sound tuning hole in the back, thus the sound damping (acoustic resistance) is larger. The difference in the acoustic resistance causes a mismatch between the sound volume and the phase of the sound outlet hole and the sound tuning hole, such that the sound directivity is not obvious in some frequency bands, resulting in sound leakage. In some conventional designs, a mesh structure is disposed between the diaphragm and the sound outlet hole to increase sound damping, but a total impedance Z of sound between the diaphragm and the sound outlet hole or sound tuning hole is not only related to an acoustic resistance R, but also related to an acoustic mass L.

The greater the acoustic resistance R and the acoustic mass L, the greater the total impedance Z. In addition, since the acoustic resistance R is inversely proportional to the fourth power of the hole diameter of a hole, the acoustic mass L is inversely proportional to the second power of the hole diameter of a hole. When the diameter decreases, the acoustic resistance R increases more than the acoustic mass L. Although small-diameter holes (holes of the traditionally used mesh structure) provide good damping effect, the sensitivity of the acoustic mass is not good, thus it is difficult to meet the requirements of achieving the same volume and while producing opposite sound directions at the sound outlet hole and the sound tuning hole.

Specifically, a conventional mesh structure and a damping paper material (not shown) has a thickness of about 50 microns and a hole diameter of about 50 microns. Since the mesh structure is a porous structure, even though the holes are irregular, the holes are small enough, and the thickness of the mesh structure is small, thus a viscosity effect occurs throughout the holes. Therefore, the mesh structure has a large acoustic resistance R and a very small acoustic mass L.

Compared with the mesh structure and the damping paper material, if there is a partition disposed between the diaphragm and the sound outlet hole, and there are large and long holes on the partition, then both the damping effect and the sensitivity of acoustic mass may be attainable, meeting the requirements of achieving the same volume while producing opposite sound directions at the sound outlet hole and the sound tuning hole, and achieving better directivity in the whole frequency range.

In this embodiment, the partition 130 is disposed in the front cavity 116 of the housing 110 to divide the front cavity 116 into a first area 1161 close to the speaker assembly 120 and a second area 1162 away from the speaker assembly 120. The partition 130 is between the first area 1161 and the second area 1162. The partition 130 has a thickness. The partition 130 includes multiple first through holes 132. The first through holes 132 pass through the partition 130 to connect the first area 1161 with the second area 1162 to generate an acoustic mass effect, effectively providing good acoustic resistance and acoustic mass.

It is worth mentioning that the size of the entire front cavity 116 affects the position of the high-frequency resonance peak of the speaker assembly 120. By adding the partition 130, the curve and phase of the sound volume of the sound outlet hole 114 at high frequency becomes more complicated. Therefore, the size and position of the partition 130 and the size of the first through hole 132 should be considered.

Specifically, in this embodiment, the volume of the diaphragm space between the diaphragm 124 and the frame 122 (that is, the volume of the speaker cavity) is between 0.7 times and 1.3 times the volume of the first area 1161. The volume of the second area 1162 is between 0.7 times and 1.3 times the volume of the rear cavity 117.

In one embodiment, the volume of the diaphragm space between the diaphragm 124 and the frame 122 (that is, the volume of the speaker cavity) is the same as the volume of the first area 1161. In one embodiment, the size of the volume of the diaphragm space between the diaphragm 124 and the frame 122 (that is, the volume of the speaker cavity) is greater than the volume of the first area 1161 and less than 1.3 times the volume of the first area 1161. In one embodiment, the volume of the diaphragm space between the diaphragm 124 and the frame 122 (that is, the volume of the speaker cavity) is less than the volume of the first area 1161 and greater than 0.7 times the volume of the first area 1161. The above-mentioned volume ranges may provide a better acoustic effect.

In addition, in this embodiment, the thickness T of the partition 130 is more than 0.6 mm, and the first through hole 132 has a hole diameter d and an axial length 1. The hole diameter d of each of these first through holes 132 is greater than 0.6 mm. The axial length 1 of each of these first through holes 132 is greater than 0.6 mm. Due to the larger hole diameter d, the viscous effect of a fluid may only occur near an annular wall surface of a first through hole 132, and no viscous effect is at the central axis of the first through hole 132. Therefore, disposing the first through hole 132 on the partition 130 may provide good acoustic resistance R and acoustic mass L characteristics.

The speaker assembly 120 includes multiple second through holes 123 formed at the frame 122. The second through holes 123 connects the interior of the speaker assembly 120 with the rear cavity 117. In this embodiment, the number of the second through holes 123 is between 0.7 times and 1.3 times the number of the first through holes 132. In one embodiment, the number of the second through holes 123 is the same as the number of the first through holes 132. In one embodiment, the number of the second through holes 123 is greater than the number of the first through holes 132 and less than 1.3 times the number of the first through holes 132. In one embodiment, the number of the second through holes 123 is less than the number of the first through holes 132 and greater than 0.7 times the number of the first through holes 132.

The size (hole diameter dl) of the second through holes 123 is between 0.7 times and 1.3 times the size (hole diameter d) of the first through holes 132. In one embodiment, the size of the second through holes 123 is the same as the size of the first through holes 132. In one embodiment, the size of the second through holes 123 is greater than the size of the first through holes 132 and less than 1.3 times the size of the first through holes 132. In one embodiment, the size of the second through holes 123 is less than the size of the first through holes 132 and greater than 0.7 times the size of the first through holes 132. The above-mentioned size and number ranges may provide a better acoustic effect.

The earbud 100 further includes a first mesh structure 140 and a second mesh structure 142. The first mesh structure 140 is disposed at the sound outlet hole 114, and the second mesh structure 142 is disposed at the sound tuning hole 115. The first mesh structure 140 and the second mesh structure 142 may be adopted to prevent dust and foreign objects from entering, and may provide acoustic resistance.

The difference in the acoustic resistance between the first mesh structure 140 and the second mesh structure 142 is between 0.8 times and 1.2 times. In one embodiment, the difference in the acoustic resistance between the first mesh structure 140 and the second mesh structure 142 is zero. In one embodiment, the acoustic resistance of the first mesh structure 140 is greater than the acoustic resistance of the second mesh structure 142 and less than 1.3 times the acoustic resistance of the second mesh structure 142. In one embodiment, the acoustic resistance of the first mesh structure 140 is less than the acoustic resistance of the second mesh structure 142 and greater than 0.7 times the acoustic resistance of the second mesh structure 142. The above-mentioned size and number ranges may facilitate in providing a better acoustic effect.

The earbud 100 of the embodiment utilizes the first through holes 132 of the partition 130 having different acoustic properties from the traditionally used mesh structure to obtain the required acoustic resistance and acoustic mass, so that the sound outlet hole 114 and the sound tuning hole 115 are more matched in sound volume and phase (same sound volume and opposite phases), resulting in an optimal directivity.

To sum up, the sound outlet hole of the earbud of the disclosure is in acoustic communication with the ear canal of a human ear but does not contact the ear canal. The speaker assembly separates a space in the housing into a front cavity and a rear cavity. A partition is disposed in the front cavity of the housing to divide the front cavity into a first area close to the speaker assembly and a second area away from the speaker assembly. The first through holes pass through the partition to connect the first area with the second area, to generate an acoustic mass effect. That is to say, the earbud of the disclosure adjusts the acoustic mass and the acoustic resistance between the speaker assembly and the sound outlet hole through the placement of the partition and the first through holes, so that the sound volume and the phase of the sound outlet hole matches that of the sound tuning hole.

Finally, it should be noted that the foregoing embodiments are only used to illustrate the technical solutions of the disclosure, but not to limit the disclosure; although the disclosure has been described in detail with reference to the foregoing embodiments, persons of ordinary skill in the art should understand that the technical solutions described in the foregoing embodiments can still be modified, or parts or all of the technical features thereof can be equivalently replaced; however, these modifications or substitutions do not deviate the essence of the corresponding technical solutions from the scope of the technical solutions of the embodiments of the disclosure.

What is claimed is:

1. An earbud, comprising:

a housing, comprising a sound outlet hole and a sound tuning hole, wherein the sound outlet hole is in acoustic communication with an ear canal of a human ear but does not contact the ear canal;

a speaker assembly, disposed in the housing to separate a space in the housing into a front cavity and a rear cavity; and a partition, disposed in the front cavity of the housing to divide the front cavity into a first area close to the speaker assembly and a second area away from the speaker assembly, wherein the partition is between the first area and the second area, and the partition has a thickness and comprises a plurality of first through holes, wherein the first through holes pass through the partition to connect the first area with the second area to generate an acoustic mass effect, wherein the speaker assembly comprises a frame, a plurality of second through holes formed at the frame, and a diaphragm disposed at the frame, and a volume of a diaphragm space between the diaphragm and the frame of the second through holes is between 0.7 times and 1.3 times a volume of the first area.

2. The earbud according to claim 1, wherein a hole diameter of each of the first through holes is greater than 0.6 mm.

3. The earbud according to claim 1, wherein an axial length of each of the first through holes is greater than 0.6 mm.

4. The earbud according to claim 1, wherein the thickness of the partition is greater than 0.6 mm.

5. The earbud according to claim 1, wherein a volume of the second area is between 0.7 times and 1.3 times a volume of the rear cavity.

6. The earbud according to claim 1, wherein the speaker assembly comprises a frame and a plurality of second through holes formed at the frame, and a number of the second through holes is between 0.7 times and 1.3 times a number of the first through holes.

7. The earbud according to claim 1, wherein the speaker assembly comprises a frame and a plurality of second through holes formed at the frame, and a size of the second through holes is between 0.7 times and 1.3 times a size of the first through holes.

8. The earbud according to claim 1, wherein a size of the sound outlet hole is between 0.7 times and 1.3 times a size of the sound tuning hole.

9. The earbud according to claim 1, further comprising a first mesh structure and a second mesh structure, wherein the first mesh structure is disposed at the sound outlet hole, the second mesh structure is disposed at the sound tuning hole, and a difference in an acoustic resistance between the first mesh structure and the second mesh structure is between 0.8 times and 1.2 times.

10. The earbud according to claim 1, wherein the housing comprises a front wall and a rear wall opposite to each other, and a side wall located between the front wall and the rear wall, wherein the speaker assembly faces the front wall, the sound outlet hole is located at the front wall, and the sound tuning hole is located at the rear wall.

* * * * *